United States Patent Office 3,141,355
Patented July 21, 1964

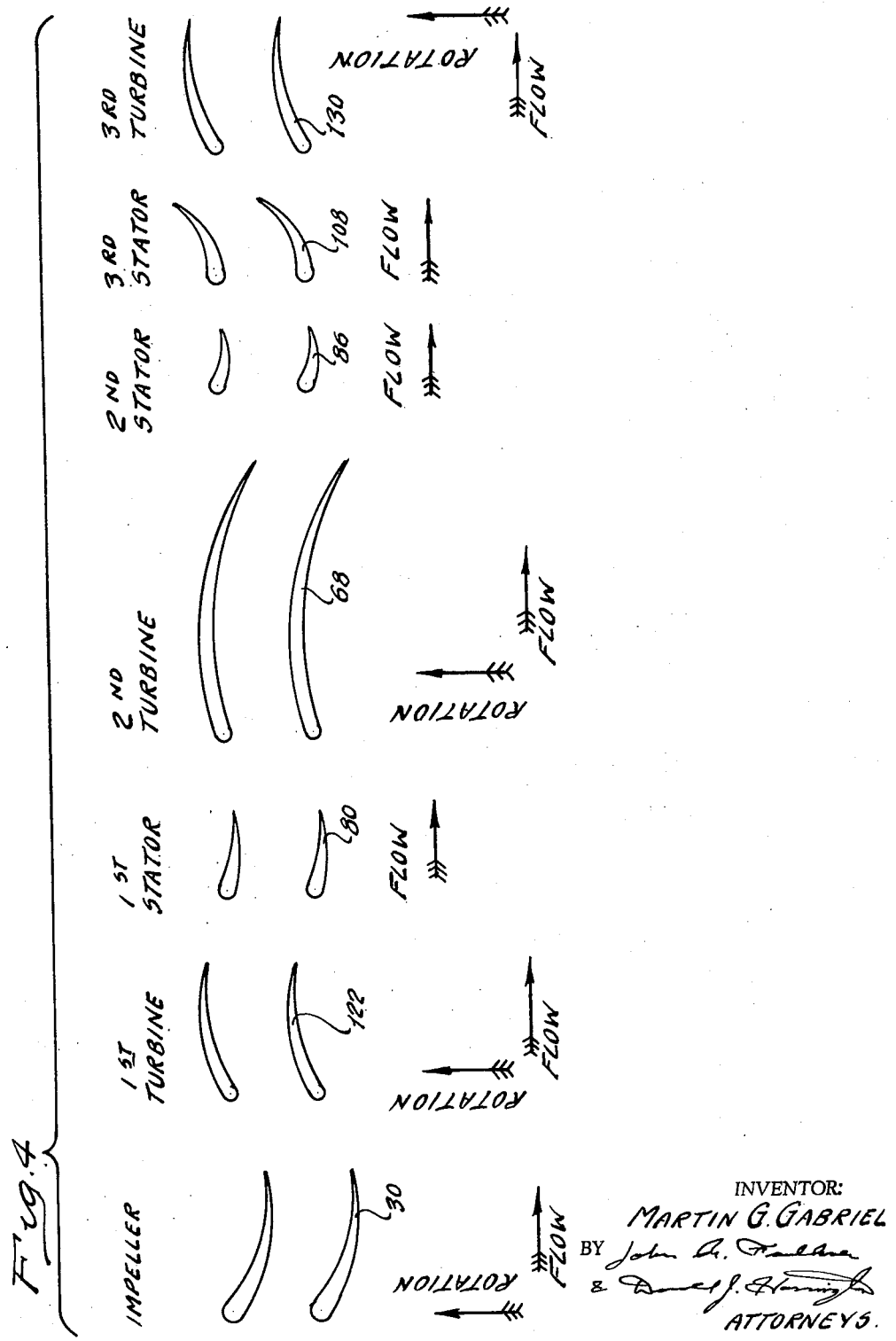

3,141,355
GEARED CONVERTER TRANSMISSION
Martin G. Gabriel, Dearborn, Mich., assignor to the Ford Motor Company, Dearborn, Mich., a corporation of Delaware
Filed Dec. 3, 1962, Ser. No. 241,725
14 Claims. (Cl. 74—677)

My invention relates generally to improvements in hydrokinetic power transmission mechanisms, and more particularly to a transmission mechanism having a hydrokinetic unit and a gear unit in combination. The hydrokinetic unit includes multiple, bladed torque transmitting members that cooperate with the elements of the gear unit to provide a broad operating range with infinitely variable torque ratio characteristics.

The improvement of my invention may be applied readily to automobile vehicle drivelines for the purpose of delivering torque from the vehicle engine to the traction wheels.

It is an object of my invention to provide a hydrokinetic torque converter transmission with infinitely variable torque ratio characteristics and which is characterized by a high degree of torque ratio carry-out. That is, it is capable of a substantial degree of torque multiplication throughout a very broad range of vehicle speeds for any given torque requirement.

It is a further object of my invention to provide a hydrokinetic power transmission mechanism of the type above set forth and which is characterized further by its simplicity in construction. I contemplate that it will employ a minimum number of friction torque establishing devices in the form of clutches and brakes.

It is a further object of my invention to provide a hydrokinetic torque transmitting mechanism that may operate in either a high torque ratio performance operating range or a high efficiency cruise operating range as desired.

It is a further object of my invention to provide a power transmission mechanism that includes a hydrokinetic torque converter and a gear unit, wherein the stator of the hydrokinetic torque converter performs the dual function of providing a hydrokinetic reaction means for the toroidal fluid flow in the converter circuit and serving as a power transmitting member capable of delivering power to one gear element of the gear unit to supplement the driving torque of the turbine of the converter.

It is a further object of my invention to provide a hydrokinetic power transmission mechanism of the type above set forth wherein a transition from one torque ratio range to another can be performed smoothly with no torque delivery interruption.

It is a further object of my invention to provide a power transmission mechanism having a hydrokinetic torque converter wherein the stator is utilized also as a reverse driving torque delivery member.

It is a further object of my invention to provide a power transmission mechanism of the type above set forth wherein the stator of the torque converter may be utilized for hill brake purposes.

For the purpose of particularly describing my invention, reference will be made to the accompanying drawings, wherein:

FIGURE 4 is a diagrammatic view illustrating the relative geometry of the blade elements of the converter. The view of FIGURE 4 is in the form of a blade cascade that is defined by unwrapping the converter circuit and illustrating it on a single plane.

Figure 1:
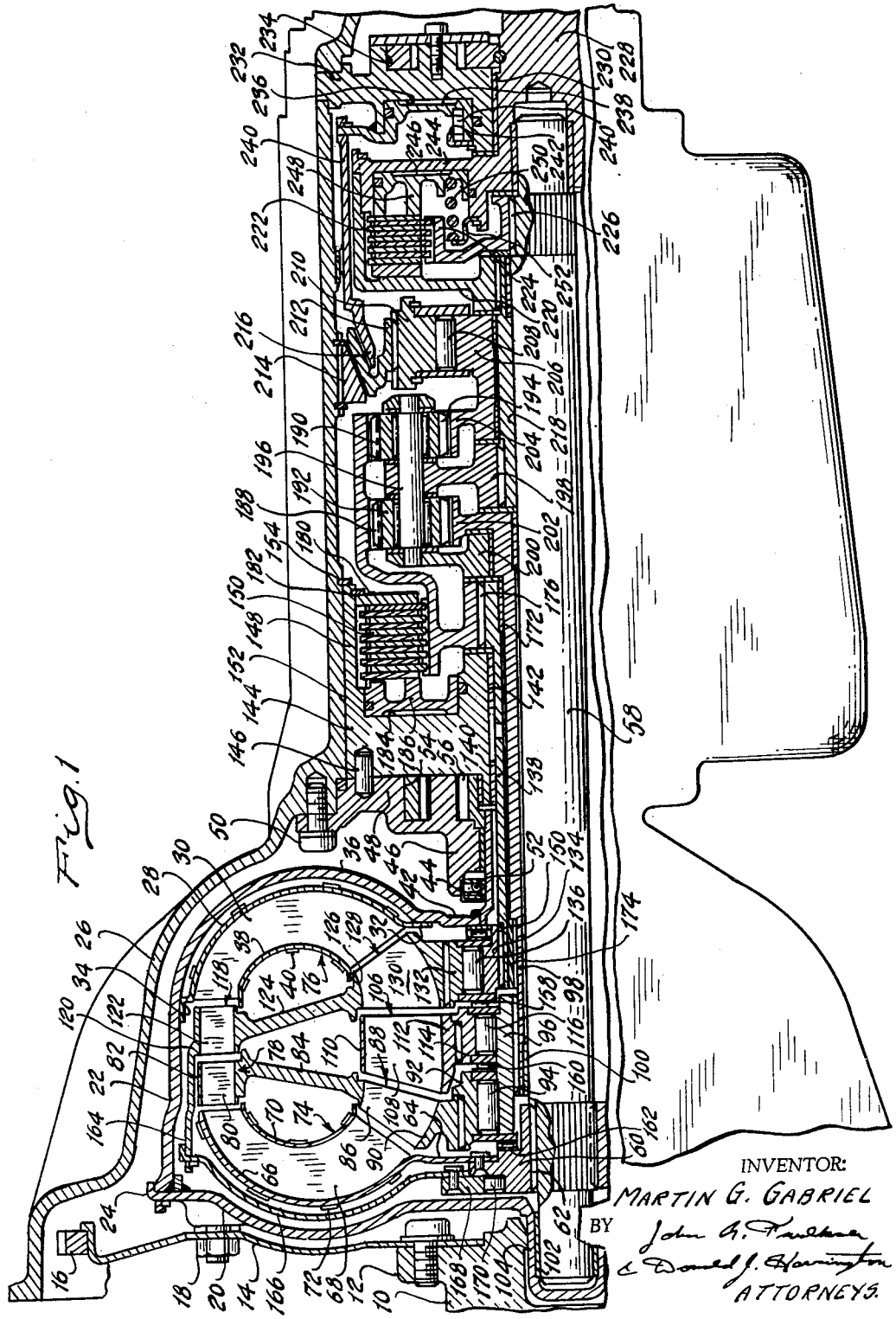
FIGURE 1 shows in cross sectional form an assembly view of a first operating embodiment of my invention.

Referring first to FIGURE 1, numeral 10 designates a power input shaft, which may be the crankshaft of an internal combustion engine. It is flanged at 12 to permit a bolted connection with a drive plate 14, the periphery of which carries an engine starter ring gear 16.

Drive plate 14 is bolted by bolts 18 to an impeller shell that comprises two principal parts identified separately by reference numerals 20 and 22. Shell part 22 is in the form of a bell housing that is secured drivably on its periphery to the periphery of shell part 20. The driving connection is generally identified by reference numeral 24. Any of several known manufacturing techniques can be used for establishing this connection.

Shell 22 is situated within a cooperating bell-shaped portion of a unitary transmission housing 26 that may be bolted or otherwise secured to the engine block for the vehicle engine.

An inner pump shell may be provided, as shown at 28, for the purpose of retaining pump blades 30. This shell 28 can be spot-welded at its inner periphery 32 to the interior of shell part 22. In a similar fashion the outer periphery 34 can be spot-welded as shown.

The shell 28 can be apertured to receive tabs 36 formed on blades 30, although other known blade fastening techniques can be employed.

An inner shroud 38 is joined to the inner edge of the impeller blades 30 and is held in place by tabs 40 that extend through cooperating apertures in shroud 38.

The hub 42 of the shell part 22 is secured to sleeve shaft 44 which is held within an extension 46 on a separator wall 48. This wall 48 is joined by bolts 50 to the interior of the housing 26. A fluid seal 52 is situated between the extension 46 and the shaft 44.

The wall 48 defines a pump cavity 54 adapted to receive positive displacement pumping elements shown in part at 56. These pumping elements define a fluid pressure source for an automatic control valve system, not shown. This valve system controls sequential operation of the various clutches and brakes subsequently to be described.

A centrally disposed turbine shaft 58 is splined to a turbine hub 60 as shown at 62. This hub 60 is riveted or otherwise secured to the radially inward portion 64 of a turbine outer shroud 66. This shroud, together with turbine blades 68, define a converter turbine situated in toroidal fluid flow relationship with respect to the converter impeller. An inner turbine shroud 70 is secured to the inner toroidal margin of the blades 68 and defines a part of the turbine fluid flow passages. Blades 68 can be secured to the shroud 66 by tabs shown at 72, said tabs being received through cooperating apertures in the shroud 66.

For purposes of convenience, the turbine hereinafter will be referred to by reference character 74, and the impeller hereinafter will be identified by the reference character 76.

A first bladed stator 78 is formed with blades 80 disposed at the entrance section of the turbine blades 68. This stator may be of cast aluminum construction although other forms may be employed as well. It includes an outer shroud 82 that defines in part toroidal fluid flow passages through the blades 80. A stator support 84 extends radially inwardly and is connected to outer margins of blades 86 for a secondary stator 88. Like the stator 78, this secondary stator 88 can be of cast construction and may be formed with the stator 78 as a unitary cast assembly.

The outer shroud 90 of the secondary stator 88 is connected to an outer race 92 for an overrunning coupling shown in part at 94. By preference the coupling is in the form of a roller coupling having rollers situated between race 92 and a race 96, the latter being splined to a sleeve shaft 98 that surrounds the aforementioned turbine shaft 58. A bushing 100 is provided between the shaft 58 and the sleeve shaft 98. Another bushing 102 is situated between the left hand end of the turbine shaft 58 and a pilot recess formed in the central portion 104 of the impeller shell part 20. This portion 104 in turn is received within a cooperating pilot recess in the end of crankshaft 10.

Disposed adjacent the fluid flow exit section of the secondary stator 86 is a third stator 106, having blades 108 about which may be formed a stator shroud 110, the shroud 110 and the blades 108 defining toroidal fluid flow passages at the radially inward region of the converter torus circuit. Another race 112 for the stator 106 is secured to an outer race 114 of an overrunning coupling shown in part at 116. Like the coupling 94, coupling 116 preferably is in the form of a roller coupling, and the roller elements are situated between race 114 and the aforementioned race 96. Both races 92 and 114 can be cammed to provide one-way braking action of the first and second stator and the third stator in one direction, while accommodating rotation in the opposite direction.

A so-called first turbine is identified generally by reference numeral 118 and it comprises an outer shroud 120 and turbine blades 122. These blades 122, together with the shroud 120, form fluid flow passages between the exit section of the impeller 76 and the entrance section of the primary stator 78.

The turbine 118 is supported by a turbine support member 124 that extends through the interior of the converter. At its radially inward end it is secured to the outer shroud 126 of a so-called third turbine 128. This turbine 128 includes blades 130 that cooperate with shroud 126 to define fluid flow passages between the exit section of the third stator 106 and the entrance section of the impeller 76.

Turbine 128 includes a race 130 that is secured to a clutch outer race 132. An inner clutch race is shown at 134, and between each race 132 and 134 are situated rollers 136. The race 134 is secured to a turbine sleeve shaft 138 that surrounds the stator shaft 98. Shaft 138 is supported rotatably by bushings 140 and 142 in an adapter 144 carried by the right-hand side of wall 48. A dowel pin 146 can be provided to lock adapter 144 against wall 48.

A drum-like extension 148 is formed on the adapter 144 and is internally splined to accommodate a splined connection with externally splined clutch discs of a multiple disc brake assembly 150. A cylindrical portion 152 of the transmission housing 26 surrounds the adapter 144. A snap-ring 154 prevents axial movement of the adapter 144 relative to the housing portion 152.

A thrust bearing 156 is situated between the hub 42 of the shell part 22 and the over-running coupling shown in part at 136. Similar thrust bearings 158 and 160 are situated between that over-running coupling and the over-running coupling shown in part at 116, and between the over-running coupling shown in part at 116 and the over-running coupling shown in part at 94. Similarly, a thrust bearing 162 is provided between the over-running coupling shown in part at 94 and a hub 60 for the turbine 74.

The outer shroud 120 for the first turbine 118 carries an extension 164 that may be keyed or otherwise secured to the outer periphery of a turbine drive member 166. The inner hub portion of the drive member 166 is drivably connected to an outer race 168 for an over-running coupling shown in part at 170. This coupling, like the other couplings described so far in this description, may be of the roller type. The race 168 may be cammed to inhibit rotation of the first turbine 118 relative to the hub 60, the rollers for the coupling 170 cooperating with the cam surfaces. Over-running motion of the turbine 118 relative to the hub 60, however, can be accommodated. Hub 60 defines an inner race for the rollers of the over-running coupling 170.

Sleeve shaft 98 and sleeve shaft 138 are supported in part by bushings 172 and 174 which are situated therebetween at spaced locations. The right-hand end of sleeve shaft 138 as viewed in FIGURE 1, has splined thereto a brake member 176 which in turn is splined externally to accommodate a driving connection with internally splined clutch discs of the aforementioned multiple brake disc assembly 150. These clutch discs are provided with a reaction disc 180 which is held fast against axial movement by a snap-ring 182 carried by the extension 148 of the adapter 144.

The adapter 144 defines an annular pressure chamber 184 within which is situated an annular piston 186. When fluid pressure is admitted to the chamber 184, brake discs of the assembly 150 are brought into frictional engagement, thus establishing a connection between the shaft 138 and the stationary housing.

The brake member 176 is connected to a pair of tandem ring-gears shown at 188 and 190. Planet pinions 192 engage ring gear 188 and planet pinions 194 engage ring gear 190. Pinions 192 and 194 are carried by a common pinion shaft 196 which in turn is carried by a carrier 198, the latter also including a carrier support 200.

A sun gear 202 drivably engages pinions 192 and the sun gear 204 drivably engages pinions 194. In this embodiment, the pitch diameters of sun gears 202 and 204 are equal.

The tandem arrangement of the ring gears 188 and 190 with their cooperating planet pinions produces balanced gear loads, although the mode of operation of this mechanism would be the same if the pinions 192 were in the form of a one-piece long pinion and the ring gear 190 were to be eliminated.

Sun gear 202 is drivably connected to sleeve shaft 98. Sun gear 204 is connected to the inner race 206 of an over-running brake shown in part at 208. The brake 208 also may be in the form of a roller brake and it includes an outer race 210 on which is secured a cone friction brake element 212. A cooperating cone brake element 214 is splined in a fixed position to a splined portion in the interior of housing portion 152. It is held against axial movement relative to the housing by snap rings as indicated. A movable cone brake element 216 is keyed to the inner surface of housing portion 152 and is adapted to move axially relative to the housing portion 152.

Upon movement in a left-hand direction as viewed in FIGURE 1, cone brake element 216 is anchored against a cooperating friction brake surface of cone brake element 214, thus holding fast the outer race 210. If the cone brake mechanism is actuated, over-running brake 208 may distribute a driving torque reaction to the housing if the torque acts in one direction. The over-running brake 208 will permit relative rotation between the sun gear 204 and the housing if the driving torque is in the opposite direction.

Gear carrier 198 is splined to a sleeve shaft 218 which surrounds turbine shaft 58. Shaft 218 supports inner race 206 and sun gear 204 by suitable bushings. It in turn is supported upon turbine shaft 58 by a bushing as indicated.

The right-hand end of sleeve shaft 218, as viewed in FIGURE 1, is splined to a drum-shaped clutch member 220. This member 220 is internally splined on its interior peripheral surface to accommodate a splined connection with externally splined clutch discs of a multiple clutch disc assembly 222. Internally splined discs of the assembly 222 are connected to an externally splined clutch member 224 which in turn is splined, as shown in 226, to shaft 58.

A power output or driven shaft is shown at 228 and is supported rotatably by bushings 230 received within a cooperating opening in an end wall 232 of the transmission housing portion 152. This end wall 232 may define a pump chamber within which pumping elements 234 are situated. The elements 234 can be in driving relationship with respect to the driven shaft 228 so that the output pressure depends upon the driven shaft speed. This pump, like the previously described impeller driven pump, may form a part of an automatic control valve system for controlling sequential operation of the various clutches and brakes.

End wall 232 defines an annular pressure chamber 236 within which is positioned annular piston 238. Piston 238 in turn is connected to an extension 240 of the previously mentioned cone brake element 216. When fluid pressure is admitted to the chamber 236, the resulting fluid pressure force is applied to the extension 240 and urges the brake element 216 into braking engagement with the elements 212 and 214, thus anchoring the element 212. A piston return spring 242 can be situated between a spring seat member 243 and the piston 238, the seat member 243 being secured to the end wall portion 232 by a snap ring.

A radial wall 244 is carried by the driven member 228. At its outer periphery, member 244 is connected to the clutch drum 220 to establish a positive driving connection therebetween.

Member 244 defines an annular pressure chamber 246. An annular piston 248 is disposed in chamber 246, thus defining a pressure cavity. Piston 248 normally is urged in a right-hand direction, as viewed in FIGURE 1, by a piston return spring 250 which is anchored by a spring seat member 252 secured to member 244 by a snap-ring as indicated.

During operation of the transmission structure of FIGURE 1, the multiple disc clutch assembly 222 can be engaged if operation in the cruise range is desired. On the other hand, if operation in the performance range is desired, multiple disc clutch assembly 222 is disengaged.

If it is assumed first that the multiple disc clutch assembly 222 is engaged, a direct driving connection is established between the second turbine 74 and the driven member 228. If we assume further that the vehicle accelerates from a standing start under these conditions, the impeller, which is driven by the engine in the usual fashion, establishes toroidal fluid circulation in the torus circuit of the converter. The torque applied to the first and third turbines is distributed under these conditions directly through over-running coupling 136 to sleeve shaft 138. This, of course, drives ring gears 188 and 190 in the forward driving direction. The carrier 198 is connected directly to driven member 228 through sleeve shaft 218, clutch member 220, and member 244. Since this is the case, sun gear 204 will tend to rotate in a reverse direction. But if the cone brake assembly 212, 214, and 216 is applied, reverse rotation of the sun gear 204 is inhibited, and thus is capable of acting as a reaction member for the planetary gear set.

With the ring gears acting as a driving or power input means and the sun gear 204 acting as a reaction member, the carrier and the driven member are rotated at a reduced speed in a forward driving direction, the turbine torque applied to the ring gear being multiplied by the gear set.

During this phase of operation, both stators 78 and 88, as well as stator 106, are subjected to a negative torque. This torque is distributed through over-running couplings, shown in part at 94 and 116, to the sleeve shaft and then to the sun gear 202. The torque thus applied to the sun gear 202 augments the torque acting in a positive direction upon the ring gears 188 and 190, and is multiplied by the gear set. The torque supplied to the carrier and the driven member is a summation of the torques acting on sun gear 202 and the ring gear 188. Since the pitch diameters of sun gears 202 and 204 are equal, rotation of the stators is inhibited so long as the forward drive multiple disc brake 150 is energized.

The torque applied to the power output member by reason of the action of the stators and the first and third turbines is augmented further by the second turbine 74. The turbine torque of turbine 74 is distributed through multiple disc clutch assembly 222 directly to the power output shaft 228, as explained previously.

As the transmission speed ratio increases, the reverse torque acting upon the first and second stators will increase until it becomes zero. At that speed ratio and at higher speed ratios, the over-running coupling shown in part at 94 will begin to free wheel. Furthermore, as the speed ratio increases, the percentage of the driving torque delivered by the second turbine 74 increases relative to the percentage of the driving torque delivered by the first and third turbines.

The torque acting upon the third stator 106 decreases also as the speed ratio increases until finally it begins to over-run by reason of the over-running action of the over-running clutch shown in part at 116. Finally during fluid coupling operation, all the driving torque is delivered by the second turbine 74, the first and third turbines being allowed to free wheel. When the torus flow is of such magnitude that they are incapable of delivering forward driving torque, over-running clutch 136 permits free wheeling of the first and third turbines.

This entire shifting sequence is performed smoothly during shifts between one ratio and another, and torque interruption is lacking.

The torque transmitting characteristics of the second turbine may be matched with the torque transmitting characteristics of the stators so that a smooth transition of torque to the gear unit and hence to the driven carrier, is experienced.

To provide hill brake operation in which the direction of the torque delivery through the mechanism is reversed, the cone brake assembly 212, 214 and 216 can be disengaged and the multiple disc brake assembly 150 can be applied. This brake assembly 150 holds the first and third turbines stationary as the sun gear 202 is over-speeded. Since the sun gear 202 is connected to the stators through over-running couplings shown in part at 94 and 116, the stators function as hydrokinetic braking members.

To provide reverse drive operation, it merely is necessary to release the cone brake assembly 212, 214 and 216 and apply the multiple disc brake assembly 150. Impeller torque thus will establish fluid circulation in the usual fashion, but the turbines 118 and 128 are held stationary by the brake assembly 150. A reverse torque then is imparted to the stators 78, 88 and 106 in the usual fashion, and this reverse torque is delivered to the sun gear 202. Since the ring gear 188 functions as a reaction member, the carrier and the power output shaft 228 are driven in a reverse direction.

It it is desired to operate the transmission mechanism in the high torque ratio performance range, it merely is necessary to release multiple clutch disc assembly 222. Under these conditions, a high degree of accelerating torque is applied to the power output shaft, and hence the torque of the second turbine is applied to turbine 118. It is distributed through over-running coupling 170. This torque augments the torque acting upon the first and third turbines, 118 and 128, respectively.

The summation of the torques acting upon the turbine 118, the turbine 74, and the turbine 128, thus is applied to the ring gears 188 and 190. This combined ring gear torque is multiplied by the gear unit with the sun gear 204 acting as a reaction member as in the case of cruising operation. The stators and the turbines function in the same fashion previously described during operation in the performance range, although the over-running clutch shown in part at 136 will not over-run until an upshift into the crusing range occurs. Such an upshift can be accomplished in the normal fashion by applying the multiple disc clutch assembly 222, thus again allowing the torque of the second turbine 74 to be distributed directly to the driven shaft through clutch 222 and shaft 58.

In FIGURE 4, I have illustrated very generally the relative blade geometries of the various hydrokinetic members. For purposes of this figure, the torus circuit has been unwrapped to provide a blade cascade.

With the impeller rotating in the direction of the vector, flow is established in a right-hand direction. The tangential component of the absolute fluid flow velocity vector will be decreased or reversed by the first turbine, thus producing a positive torque upon the first turbine. This torque, as previously explained, is distributed to the ring gears 188 and 190. As the fluid leaves the exit section of the first turbine and passes through the bladed passages of the first stator, the tangential component of the absolute fluid flow velocity vector is changed again, but in the opposite direction, thus producing a reaction upon the first stator in a reverse direction relative to the reaction force of the first turbine. This reaction force, of course, is distributed to the sun gear 202 as previously explained.

As the fluid flow leaves the first stator and passes through the bladed passages of the second turbine, the tangential component of the absolute fluid flow velocity vector, as augmented by the first stator, again is decreased or reversed thus driving the second turbine in the direction of the rotation vector illustrated in FIGURE 4. If the multiple disc clutch assembly 222 is applied, this reaction force on the second turbine is distributed directly to the power output shaft, as previously explained. If the transmission mechanism is operating in the performance range, however, this torque is applied to the torque of the first turbine through over-running coupling 170.

The second stator again changes the absolute fluid flow velocity vector for the fluid leaving the exit section of the second turbine. It is changed further by the third turbine so that the combined reaction torques of the second and third stators is applied to the sun gear 202 to supplement the torque of the first stator. The second stator, of course, will free-wheel before the third stator free-wheels since they are mounted upon independent roller clutches. This produces a higher degree of carry-out or torque multiplication range than in the case of a converter having a single stator at this location in the circuit.

The absolute fluid flow velocity vector of the fluid that leaves the first stator is changed again by the third turbine to cause a torque reaction upon the third turbine that supplements the torque of the first and second turbines, so that the third turbine tends to rotate in the direction of the arrow shown in FIGURE 4.

Figure 2:
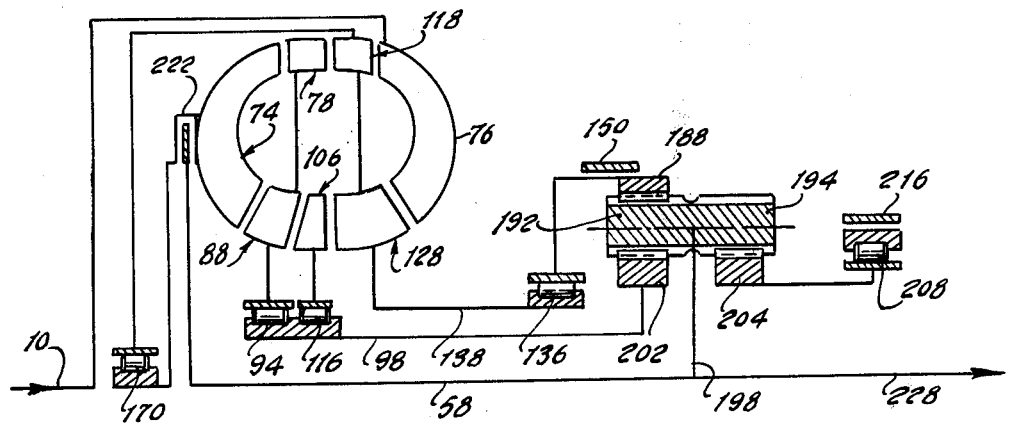
FIGURE 2 is a schematic representation of the assembly of FIGURE 1.
Figure 3:
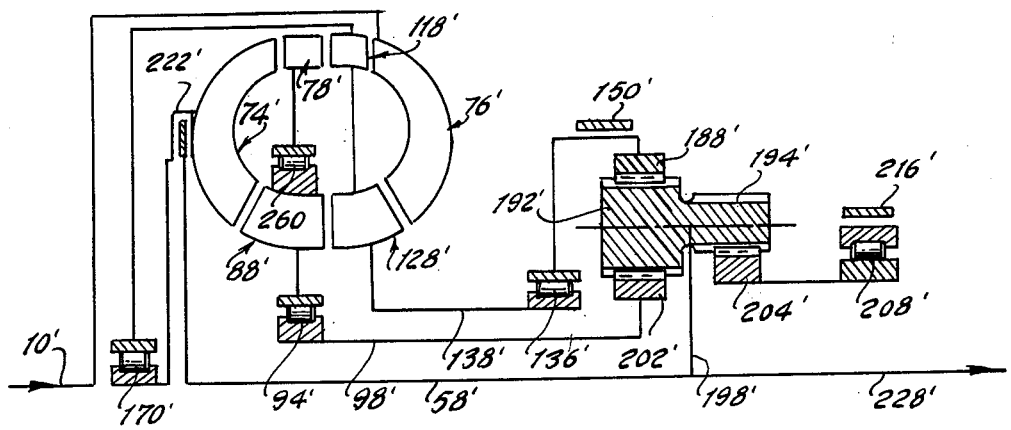
FIGURES 3 and 3A are schematic representations of alternate embodiments of my invention.
Figure 3A:
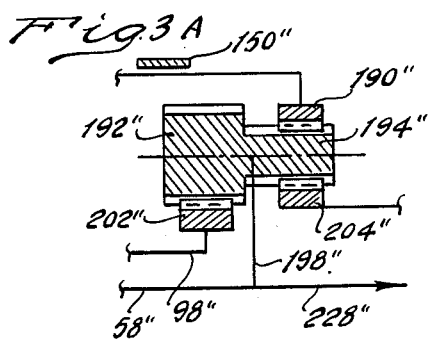

I have shown in FIGURE 2 a schematic representation of the structure shown in FIGURE 1. In FIGURES 3 and 3A, however, I have shown alternate arrangements in schematic form. The structure of FIGURE 3 may be similar to the structure of FIGURES 1 and 2, and corresponding parts have been designated by corresponding reference numerals although primed notations have not been applied to the numerals of FIGURE 3. A principal distinction, however, between the structures of FIGURE 2 and FIGURE 3 is in the relative pitch diameters of the sun gears. The pitch diameter of sun gear 202' is smaller than the pitch diameter of sun gear 204'. Since this is the case, the stators 78' and 88' will rotate in a reverse direction during the torque multiplication range. Sun gear 204', like the sun gear 204 of the first embodiment, functions as a reaction member. But due to the differential in pitch diameters, the stators 78 and 88 will rotate in a reverse direction by reason of the reverse torque produced by the hydrokinetic reaction explained previously. The torque of the stators 78' and 88', however, still augments the effective output torque 98' as in the previous embodiments.

In FIGURE 3A I have illustrated an alternate arrangement that is designed to produce forward rotation of the stators in the torque conversion range. The ring gear shown at 190" in FIGURE 3A engages the smaller of the planet pinions, the latter in turn engaging the relatively large diameter sun gear, 204".

For convenience, double prime notations have been applied to the embodiment of FIGURE 3A, since the elements of this embodiment have corresponding elements in each of the other embodiments.

In the embodiment of FIGURE 3, only a single ring gear 188' is employed, and no ring gear corresponding to ring gear 190 of the early embodiment is used. Similarly, in the optional embodiment of FIGURE 3A, there is no ring gear corresponding to ring gear 188 of the first embodiment.

By appropriately choosing the relative pitch diameters of the sun gears in the gear unit, the optimum stator speed can be controlled. The stator speed can be matched appropriately with the blade geometry of the stator, as well as the other converter member, to provide either a high performance converter or a converter that favors high efficiency operation in the cruising range as desired. The choice of sun gear diameters thus introduces a new design variable that may be employed successfully to provide a transmission arrangement with optimum characteristics. In the embodiment of FIGURE 1, the stator does not rotate in either direction. In the embodiment of FIGURE 3, the stator rotates in a reverse direction at a controlled rate, and in the embodiment of FIGURE 3A, the stator rotates at a controlled rate in a forward direction. In each case, the function of the stator is the same.

It will be noted that in the embodiment of FIGURE 3, I have introduced a second over-running coupling for the first and second stators and have eliminated the third stator. If desired, however, a third stator may be employed in the embodiment of FIGURE 3 as in the embodiment of FIGURE 1.

The additional over-running coupling for the first and second stators 78' and 88' of the embodiment of FIGURE 3 is identified by reference character 260. It comprises an outer race connected to the stator 78' and an inner race connected to the stator 88'. Relative rotation of the stator 78' relative to the stator 88' in a forward direction thus can be accommodated, while the stator 88' still is subjected to a negative torque reaction. Such an independent free wheeling function can be introduced if additional torque multiplication carry-out is desired, or if improved coupling efficiency is desired. The use of the over-running coupling 260 introduces still another design variable that may be used to provide overall optimum performance throughout the entire transmission operating range.

Having thus described preferred embodiments of my invention, what I claim and desire to secure by United States Letters Patent is:

1. A power transmission mechanism comprising a hydrokinetic unit and a gear unit, said hydrokinetic unit comprising an impeller, a first bladed torque transmitting member, a second bladed torque transmitting member, a third bladed torque transmitting member, said impeller and said torque transmitting members being disposed in toroidal fluid flow relationship in a common torus circuit, a driving member connected to said impeller, said gear unit comprising a first torque input element, a second torque input element, a third element forming a geared connection between said first and second elements and a reaction element, brake means for anchoring said reaction element, a driven member, means for connecting said third element to said driven member, a first driving connection between said first bladed torque transmitting member and said first element including an over-running coupling capable of transmitting torque in one direction and capable of free-wheeling in the opposite direction, a second driving connection between said second element and said second torque transmitting member, and a third driving connection between said driven member and said third torque transmitting member, said second driving connection being defined in part by an over-running coupling capable of delivering torque to said second element in a direction opposite to the direction of torque delivered to said first torque input element and capable also of free-wheeling in said latter direction when the speed of said driven member approaches the speed of said driving member.

2. A power transmission mechanism comprising a hydrokinetic unit and a gear unit, said hydrokinetic unit comprising an impeller, a first bladed torque transmitting member, a second bladed torque transmitting member, a third bladed torque transmitting member, said impeller and said torque transmitting members being disposed in toroidal fluid flow relationship in a common torus circuit, a driving member connected to said impeller, said gear unit comprising a first torque input element, a second torque input element, a third element forming a geared connection between said first and second elements and a reaction element, brake means for anchoring said reaction element, a driven member, means for connecting said third element to said driven member, a first driving connection between said first bladed torque transmitting member and said first gear element including an over-running coupling capable of transmitting torque in one direction and capable of free-wheeling in the opposite direction, a second driving connection between said second torque input element and said second torque transmitting member, and a third driving connection between said driven member and said third torque transmitting member, said second driving connection being defined in part by an over-running coupling capable of delivering torque to said second torque input element in a direction opposite to the direction of torque delivered to said first torque input element and capable also of free-wheeling in said latter direction when the speed of said driven member approaches the speed of said driving member, said third driving connection being defined in part by a selectively engageable torque delivery clutch.

3. A power transmission mechanism comprising a hydrokinetic unit and a gear unit, said hydrokinetic unit comprising an impeller, a first bladed torque transmitting member, a second bladed torque transmitting member, a driving member connected to said impeller, said gear unit comprising a ring gear element, a first sun gear element, planet gears, a carrier element rotatably supporting said planet gears, said planet gears being disposed in driving relationship with respect to said sun and ring gear elements and a second sun gear element engageable with said planet gears, said sun gears being journaled independently for independent rotation, brake means for anchoring said second sun gear element, a driven member, means for connecting said carrier to said driven member, a first driving connection between said first torque transmitting member and said ring gear element, and a second driving connection between said second torque transmitting member and said first sun gear element, said second driving connection being defined in part by an over-running coupling capable of delivering driving torque to said first sun gear element in a direction opposite to the direction of torque delivered to said ring gear element when both torque transmitting members are simultaneously active during forward drive and capable of free-wheeling in the opposite direction.

4. A power transmission mechanism comprising a hydrokinetic unit and a gear unit, said hydrokinetic unit comprising an impeller, a first bladed torque transmitting member, a second bladed torque transmitting member, a third bladed torque transmitting member, said torque transmitting members and said impeller being disposed in a common toroidal fluid flow circuit, said gear unit comprising first and second torque input elements, means for drivably connecting said first torque transmitting member to said first torque input element and including an over-running coupling capable of delivering torque to said first input element in one direction while accommodating free-wheeling motion of said first torque transmitting member in the opposite direction, means for connecting said second torque input element to said second bladed torque transmitting member including a second over-running coupling capable of delivering torque in said opposite direction to said second torque input element while accommodating free-wheeling motion of said second bladed torque transmitting member in said one direction, a third element of said gear unit drivably engageable with said first and second elements, a reaction element of said gear unit engageable with said third element, brake means for anchoring said reaction element, a driven member, means for drivably connecting said third torque transmitting member to said driven member and means for connecting said third element to said driven member.

5. A power transmission mechanism comprising a hydrokinetic unit and a gear unit, said hydrokinetic unit comprising an impeller, a first bladed torque transmitting member, a second bladed torque transmitting member, a third bladed torque transmitting member, said torque transmitting members and said impeller being disposed in a common toroidal fluid flow circuit, said gear unit comprising first and second torque input elements, means for drivably connecting said first torque transmitting member to said first torque input element and including an over-running coupling capable of delivering torque to said first torque input element in one direction while accommodating free-wheeling motion of said first torque transmitting member in the opposite direction, means for connecting said second torque input element to said second bladed torque transmitting member including a second over-running coupling capable of delivering torque in said opposite direction to second torque input element while accommodating free-wheeling motion of said second bladed torque transmitting member in said one direction, a third element of said gear unit drivably engageable with said first and second gear elements, a reaction element of said gear unit engageable with said third element, brake means for anchoring said reaction element, a driven member, means for drivably connecting said third torque transmitting member to said driven member and means for connecting said third element to said driven member, the driving connection between said third torque transmitting member and said driven member being defined in part by a selectively engageable friction torque establishing device.

6. A power transmission mechanism comprising a hydrokinetic unit and a gear unit, said hydrokinetic unit comprising an impeller, a first bladed torque transmitting member, a second bladed torque transmitting member, a third bladed torque transmitting member, said impeller and said torque transmitting members being disposed in toroidal fluid flow relationship in a common torus circuit, a driving member connected to said impeller, said gear unit comprising a first torque input element, a second torque input element, a third element forming a geared connection between said first and second elements and a reaction element, brake means for anchoring said reaction element, a driven member, means for connecting said third element to said driven member, a first driving connection between said first bladed torque transmitting member and said first element including an over-running coupling capable of transmitting torque in one direction and capable of free-wheeling in the opposite direction, an over-running coupling connection between said third torque transmitting member and said first torque transmitting member capable of delivering torque from the former to the latter in said one direction, and a second driving connection between said driven member and said third torque transmitting member, a third driving connection defined in part by an over-running coupling capable of delivering torque from said second bladed torque transmitting member to said second torque input element in a direction opposite to the direction of torque delivered to said first torque input element and capable also of free-wheeling in said latter direction when the speed of said driving member approaches the speed of said driving member.

7. A power transmission mechanism comprising a hydrokinetic unit and a gear unit, said hydrokinetic unit comprising an impeller, a first bladed torque transmitting member, a second bladed torque transmitting member, a third bladed torque transmitting member, said torque transmitting members and said impeller being disposed in a common toroidal fluid flow circuit, said gear unit comprising first and second torque input elements, means for drivably connecting said first torque transmitting member to said first torque input element and including an over-running coupling capable of delivering torque to said first torque input element in one direction while accommodating free-wheeling motion of said torque transmitting member in the opposite direction, means for connecting said second input torque element to said second bladed torque transmitting member including a second over-running coupling capable of delivering torque in said opposite direction to said second torque input element while accommodating free-wheeling motion of said second bladed torque transmitting member in said one direction, a third element of said gear unit drivably engageable with said first and second elements, a reaction element engageable with said third element, brake means for anchoring said reaction element, a driven member, means for connecting said third element to said driven member, and an over-running coupling connection between said third torque transmitting member and said first torque transmitting member capable of delivering torque from the former to the latter in said one direction.

8. A power transmission mechanism comprising a hydrokinetic unit and a gear unit, said hydrokinetic unit comprising an impeller, a first bladed torque transmitting member, a second bladed torque transmitting member, a driving member connected to said impeller, said gear unit comprising a ring gear element, a first sun gear element, planet gear, a carrier element rotatably supporting said planet gears, said planet gears being disposed in driving relationship with respect to said sun and ring gear elements and a second sun gear element engageable with said planet gears, said sun gears being journaled independently for independent rotation, brake means for anchoring said second sun gear element, a driven member, means for connecting said carrier to said driven member, a first driving connection between said first torque transmitting member and said ring gear element, a second driving connection between said second torque transmitting member and said first sun gear element, said second driving connection being defined in part by an over-running coupling capable of delivering driving torque to said first sun gear element in a direction opposite to the direction of torque delivered to said first ring gear element when both torque transmitting members are simultaneously active during forward drive and capable of free-wheeling in the opposite direction, and a selectively engageable brake for anchoring said ring gear element during reverse drive.

9. A power transmission mechanism comprising a hydrokinetic unit and a gear unit, said hydrokinetic unit comprising an impeller, a first bladed torque transmitting member, a second bladed torque transmitting member, a third bladed torque transmitting member, said torque transmitting members and said impeller being disposed in a common toroidal fluid flow circuit, said gear unit comprising first and second torque input elements, means for drivably connecting said first torque transmitting member to said first torque input element and including an over-running coupling capable of delivering torque to said first torque input element in one direction while accommodating free-wheeling motion of said first torque transmitting member in the opposite direction, means for connecting said second torque input element to said second bladed torque transmitting member including a second over-running coupling capable of delivering torque in said opposite direction to said second torque input element while accommodating a free-wheeling motion of said second bladed torque transmitting member in said one direction, a third element of said gear unit drivably engageable with said first and second gear elements, a reaction element of said gear unit engageable with said third element, brake means for anchoring said reaction element, a driven member, means for drivably connecting said third torque transmitting member to said driven member, means for connecting said third element to said driven member, and a selectively engageable brake means for anchoring said first torque input element.

10. A power transmission mechanism comprising a hydrokinetic unit and a gear unit, said hydrokinetic unit comprising an impeller, a first bladed torque transmitting member, a second bladed torque transmitting member, a third bladed torque transmitting member, said torque transmitting members and said impeller being disposed in a common toroidal fluid flow circuit, said gear unit comprising first and second torque input elements, means for drivably connecting said first torque transmitting member to said first torque input element and including an over-running coupling capable of delivering torque to said first torque input element in one direction while accommodating free-wheeling motion of said first torque transmitting member in the opposite direction, means for connecting said second torque input element to said second bladed torque transmitting member including a second over-running coupling capable of delivering torque in said opposite direction to said second torque input element while accommodating free-wheeling motion of said second bladed torque transmitting member in said one direction, a third element of said gear unit drivably engageable with said first and second elements, a reaction element of said gear unit engageable with said third element, brake means for anchoring said reaction element, a driven member, means for connecting said third element to said driven member, the driving connection between said third torque transmitting member and said driven member being defined in part by a selectively engageable friction torque establishing device and a selectively engageable brake means for anchoring said first torque input element.

11. A power transmission mechanism comprising a hydrokinetic torque converter and a planetary gear unit, said torque converter comprising an impeller, a driving member connected to said impeller, a first turbine, a second turbine and a turbo stator, said impeller, said turbine and said turbo stator being disposed in a common toroidal fluid flow circuit, said planetary gear unit comprising a pair of sun gears, means for anchoring selectively one of said sun gears, a carrier, planet gears carried by said carrier in meshing engagement with said sun gears, a ring gear engageable with said planet gears, a driven member, said carrier being connected to said driven member, an over-running coupling connection between said ring gear and said first turbine capable of delivering torque to said ring gear in one direction and accommodating relative over-running motion in the opposite direction, another over-running coupling connection between said first sun gear and said turbo stator capable of delivering torque to said first sun gear in the opposite direction while accommodating free-wheeling motion of said turbo stator in said one direction, a third over-running coupling connection between said second turbine and said first turbine, and selectively engageable clutch means between said second turbine and said driven member.

12. A power transmission mechanism comprising a hydrokinetic torque converter and a planetary gear unit, said torque converter comprising an impeller, a driving member connected to said impeller, a first turbine, a second turbine and a turbo stator, said impeller, said turbines and said turbo stator being disposed in a common toroidal fluid flow circuit, said planetary gear unit comprising a pair of sun gears, means for anchoring selectively one of said sun gears, a carrier, planet gears carried by said carrier in meshing engagement with said sun gears, a ring gear engageable with said planet gears, a driven member, said carrier being connected to said driven member, an over-running coupling connection between said ring gear and said first turbine capable of delivering torque to said ring gear in one direction and accommodating relative over-running motion in the opposite direction, another over-running coupling connection between said first sun gear and said turbo stator capable of delivering torque to said first sun gear in the opposite direction while accommodating free-wheeling motion of said turbo stator in said one direction, a third over-running coupling connection between said second turbine and said first turbine, selectively engageable clutch means for connecting said second turbine and said driven member, and a selectively engageable brake means for anchoring said ring gear.

13. A power transmission mechanism comprising a hydrokinetic torque converter and a planetary gear unit, said torque converter comprising an impeller, first and second turbines and first and second turbo stators, a driving member connected to said impeller, a driven member, said impeller, said turbines and said turbo stators being disposed in a toroidal fluid flow circuit, said first turbo stator being disposed in a radially outward fluid flow region of said circuit and said second turbo stator being disposed in a radially inward fluid flow region of said circuit, said gear unit comprising a pair of sun gears, a series of planet gears engageable with said sun gears, a ring gear engageable with said planet gears, a carrier supporting said planet gears, said carrier being connected to said driven member, means for anchoring a first of said sun gears, a first over-running coupling connection between the second of said sun gears and second turbo stator, said second turbo stator being connected to said first turbo stator, another over-running coupling connection between said first turbine and said ring gear, said other over-running coupling connection being adapted to deliver torque in one direction and accommodating free-wheeling motion of said first turbine in the opposite direction, and said first over-running coupling connection being capable of delivering torque in said opposite direction and accommodating free-wheeling motion of said turbo stators in said one direction, a third over-running coupling connection between said second turbine and said first turbine, and a selectively engageable friction clutch means for drivably connecting said second turbine and said driven member.

14. A power transmission mechanism comprising a hydrokinetic torque converter and a planetary gear unit, said torque converter comprising an impeller, a driving member connected to said impeller, a driven member, said converter including also a first turbine, a first turbo stator, a second turbine, a second turbo stator and a third turbine arranged in series in a toroidal fluid flow circuit, said first and third turbines being connected together, said first turbine and said first turbo stator being disposed in a radially outward fluid flow region of said circuit and said second turbo stator and said third turbine being disposed in a radially inward fluid flow region of said circuit, means for connecting said first and second turbines together, said gear unit comprising a pair of sun gears, a series of planet gears engageable with said gun gears, a ring gear engageable with said planet gears, a carrier supporting said planet gears, said carrier being connected to said driven member, means for anchoring a first of said sun gears, a first over-running coupling connection between the second of said sun gears and said second turbo stator, said second turbo stator being connected to said first turbo stator, a second over-running coupling connection between said first and third turbines and said ring gear, said second over-running coupling connection being adapted to deliver torque in one direction and accommodating free-wheeling motion of said first and third turbines in the opposite direction, and said first over-running coupling connection being capable of delivering torque in said opposite direction and accommodating free-wheeling motion of said turbo stators in said one direction, a third over-running coupling connection between said second turbine and said first turbine, a selectively engageable friction clutch means for drivably connecting said second turbine and said driven member, and a selectively engageable brake means for anchoring said ring gear.

References Cited in the file of this patent
UNITED STATES PATENTS

| | | |
|---|---|---|
| 2,695,533 | Pollard | Nov. 30, 1954 |
| 2,893,266 | Kelley | July 7, 1958 |
| 2,905,025 | Karlsson et al. | Sept. 22, 1959 |
| 2,919,604 | De Lorean | Jan. 5, 1960 |
| 3,021,727 | Kelley et al. | Feb. 20, 1962 |
| 3,030,823 | Kelley | Apr. 24, 1962 |
| 3,063,308 | Wayman | Nov. 13, 1962 |